(12) United States Patent
Schultz et al.

(10) Patent No.: US 9,926,469 B2
(45) Date of Patent: Mar. 27, 2018

(54) OLIGOMERIC QUINOLINE COMPOUNDS FOR TACKIFYING PRESSURE SENSITIVE ADHESIVES

(71) Applicant: 3M INNOVATIVE PROPERTIES COMPANY, St. Paul, MN (US)

(72) Inventors: Kimberly C. M. Schultz, Woodbury, MN (US); Nathan E. Schultz, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/514,141

(22) PCT Filed: Sep. 17, 2015

(86) PCT No.: PCT/US2015/050556
§ 371 (c)(1),
(2) Date: Mar. 24, 2017

(87) PCT Pub. No.: WO2016/048768
PCT Pub. Date: Mar. 31, 2016

(65) Prior Publication Data
US 2017/0298256 A1 Oct. 19, 2017

Related U.S. Application Data

(60) Provisional application No. 62/055,713, filed on Sep. 26, 2014.

(51) Int. Cl.
C09J 7/00 (2006.01)
C09J 7/02 (2006.01)
C09J 133/02 (2006.01)
C08K 5/3432 (2006.01)

(52) U.S. Cl.
CPC ........... *C09J 7/0217* (2013.01); *C09J 133/02* (2013.01); *C08K 5/3432* (2013.01); *C09J 2205/102* (2013.01)

(58) Field of Classification Search
None
See application file for complete search history.

(56) References Cited

U.S. PATENT DOCUMENTS

| 2,947,710 | A | 8/1960 | Frantz |
| 7,326,462 | B2 | 2/2008 | Ishiguro |
| 2006/0135675 | A1 | 6/2006 | Ishiguro |
| 2006/0142493 | A1* | 6/2006 | Hughes ..................... C08F 2/24 525/210 |

FOREIGN PATENT DOCUMENTS

| EP | 1674481 | 6/2006 |
| EP | 1690907 | 8/2006 |
| EP | 2065455 | 6/2009 |
| JP | 2730986 | 6/1990 |
| WO | WO 1998-15413 | 4/1998 |
| WO | WO 2009-009009 | 1/2009 |

OTHER PUBLICATIONS

Poh, "Dependence of Adhesion Property of SMR L-based Adhesives on Antixidants", Journal of Elastomers and Plastics, Mar. 2010, vol. 42, pp. 151-161.
van Krevelen, D. W.; Properties of Polymers: Their Estimation and Correlation with Chemical Structure, $2^{nd}$ ed., Elseveir, Amsterdam, pp. 135-143, 1976.
International Search report for PCT International Application No. PCT/US2015/050556 dated Nov. 25, 2015, 5 pages.

* cited by examiner

*Primary Examiner* — Lisha Jiang
(74) *Attorney, Agent, or Firm* — Julie Lapos-Kuchar

(57) ABSTRACT

Described herein is an adhesive composition comprising: (a) a (meth)acryloyl polymer; and (b) greater than 1 parts of a tackifier per 100 parts of the (meth)acryloyl polymer, wherein the tackifier comprises a substituted oligomeric quinoline.

11 Claims, No Drawings under 35 U.S.C.
OLIGOMERIC QUINOLINE COMPOUNDS FOR TACKIFYING PRESSURE SENSITIVE ADHESIVES

CROSS REFERENCE TO RELATED APPLICATIONS

This application is a national stage filing under 35 U.S.C. 371 of PCT/US2015/050556, filed Sep. 17, 2015, which claims the benefit of U.S. Application No. 62/055,713, filed Sep. 26, 2014, the disclosure of which is incorporated by reference in its/their entirety herein.

TECHNICAL FIELD

Substituted oligomeric quinolone compounds are disclosed for use in tackifying (meth)acryloyl adhesives.

SUMMARY

There is a desire for identifying new tackifiers that can be used in (meth)acryloyl adhesive systems.

In one aspect, an adhesive composition is provided comprising:
(a) a (meth)acryloyl polymer; and
(b) greater than 1 parts of a tackifier per 100 parts of the (meth)acryloyl polymer, wherein the tackifier comprises a substituted oligomeric quinoline.

In one aspect, an article is provided comprising an adhesive composition comprising:
(a) a (meth)acryloyl polymer; and
(b) greater than 1 parts of a tackifier per 100 parts of the (meth)acryloyl polymer, wherein the tackifier comprises a substituted oligomeric quinoline.

In yet another aspect, a method of making an article is provided comprising (i) providing an adhesive composition comprising:
(a) a (meth)acryloyl polymer; and
(b) greater than 1 parts of a tackifier per 100 parts of the (meth)acryloyl polymer, wherein the tackifier comprises a substituted oligomeric quinoline; and
(ii) applying the adhesive composition onto a substrate.

The above summary is not intended to describe each embodiment. The details of one or more embodiments of the invention are also set forth in the description below. Other features, objects, and advantages will be apparent from the description and from the claims.

DETAILED DESCRIPTION

As used herein, the term
"a", "an", and "the" are used interchangeably and mean one or more;

"and/or" is used to indicate one or both stated cases may occur, for example A and/or B includes, (A and B) and (A or B);

"(meth)" in front of a term means the term may or may not comprise a methyl group. For example "(meth)acrylate" refers to compounds containing either an acrylate (CH$_2$=CHC(O)O$^-$) or a methacrylate (CH$_2$=CCH$_3$C(O)O$^-$) structure or combinations thereof;

"(meth)acryloyl" used herein includes both (meth)acrylate and (meth)acrylamide;

"Tg" refers to the glass transition temperature of the polymer.

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

Tackifiers are organic compounds, which are added to adhesives to increase the tack, or stickiness of the adhesive. Tackifying resins for pressure sensitive adhesives can generally be categorized as terpenes/modified terpenes, hydrocarbons (aliphatic, aromatic and mixtures thereof), or rosin esters (derived from wood, rosin, or talloil). Usually, tackifier is added to increase the adhesive strength (peel force) of an adhesive to a given substrate. In some cases, the increase in peel force is accompanied by a concomitant decrease in cohesive strength (shear).

The present disclosure is directed toward a novel tackifier for use in pressure sensitive adhesives, namely a substituted oligomeric quinoline.

Substituted Oligomeric Quinoline

The novel tackifier disclosed herein is a substituted oligomeric quinoline, which herein refers to an oligomer comprising the following unit:

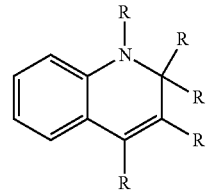

R is independently selected from H, a halogen, or an organic group (i.e., a hydrocarbon group with optional elements other than carbon and hydrogen, such as oxygen, nitrogen, sulfur, silicon, and halogens).

In one embodiment, the substituted oligomeric quinoline is partially hydrogenated.

R is not particularly limited so long as the substituted oligomeric quinoline functions as a tackifier as disclosed herein. In one embodiment, R is an aliphatic group (i.e., a saturated or unsaturated linear or branched hydrocarbon group), cyclic group, or combination thereof (e.g., alkaryl and aralkyl groups) which optionally comprises at least one catenated heteroatom (such as O, N or S) or is substituted with at least one halogen.

In one embodiment, the organic group is an alkyl group, optionally comprising at least one catenated O, N or S atom, and/or optionally comprising a halogen. The alkyl group may be linear, branched, and/or cyclical. In one embodiment, the organic group is an aryl group, optionally comprising at least one catenated O, N or S atom, and/or optionally comprising a halogen. The alkyl group may be linear, branched, and/or cyclical. In one embodiment, the organic group is an alkenyl group, optionally comprising at least one catenated O, N or S atom, and/or optionally comprising a halogen with one or more carbon-carbon double bonds. The alkenyl group may be linear, or branched. In one embodiment, the organic group is an aryl group, which refers to a monovalent group that is aromatic and, optionally, carbocyclic. The aryl has at least one aromatic ring optionally comprising at least one catenated O, N or S atom, and/or optionally comprising a halogen. Any additional rings can be unsaturated, partially saturated, saturated, or aromatic. Optionally, an aromatic ring can have one or more additional carbocyclic rings that are fused to the aromatic ring. In one embodiment, the organic group is a combination of alkyl, alkenyl, or aryl groups such as aralkyl or alkaryl group.

The oligomer comprises at least 3, 4, 6, or even 10 dihydroquinoline units and less than 100 or even 50 dihydroquinoline units. Exemplary substituted oligomeric quinolines include those of the formula

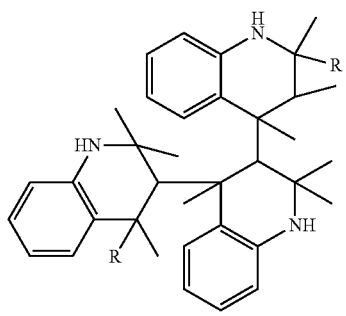

where R represents a point of attachment. Such substituted oligomeric quinolines may be available under the trade designation "AGERITE" by Vanderbilt Chemicals, LLC, Norwalk, Conn., which are sold as an amine antioxidant for natural and synthetic rubbers, said to retard oxidation and heat deterioration under severe conditions. In the present application, it has been surprisingly discovered that when the substituted oligomeric quinolineis used at levels greater than 1, 2, 3, 4, 5, 6, 8, or even 10 parts per 100 parts (meth)acryloyl polymer, improved adhesion and peel force can be observed. In one embodiment, less than 100, 75, 50 or even 45 parts of substituted oligomeric quinolineper 100 parts (meth)acryloyl polymer is used.

In one embodiment, the substituted oligomeric quinolines may have a molecular weight of at least 500, 600, or even 700 grams/mole (g/mol) and no more than 2000 g/mol.

In one embodiment, the substituted oligomeric quinolines have a softening point of at least 70° C. and no more than 140° C., 80° C. to 110° C., or even 110° C. to 140° C.

In one embodiment, the substituted oligomeric quinolines have a polarity of 0.7 to 2 or even 0.8 to 1.2 as defined by the polar contribution to the van Krevelen solubility parameter (van Krevelen, D. W.; *Properties of Polymers: Their Estimation and Correlation with Chemical Structure,* 2nd ed., Elseveir, Amsterdam, 1976).

In one embodiment, the substituted oligomeric quinolines have a dispersion of 20 to 30, or even 20-24, as determined by the dispersive contribution to van Krevelen's solubility parameter, using the method described above.

(Meth)acryloyl Polymer

The adhesive of the present disclosure comprises a (meth) acryloyl polymer. The (meth)acryloyl polymer is derived from one or more (meth)acrylate ester monomers derived from a (e.g. non-tertiary) alcohol containing from 1 to 22 carbon atoms and preferably an average of from 4 to 14 carbon atoms.

Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctyl-alcohol, 2-ethyl-1-hexanol, 1-decanol, 2-propylheptanol, 1-dodecanol, 1-tridecanol, 1-tetradecanol, and the like.

In one embodiment, the adhesive comprises one or more low Tg (meth)acrylate monomers, having a Tg no greater than 10° C. when reacted to form a homopolymer. In some embodiments, the low Tg monomers have a Tg no greater than 0° C., no greater than −5° C., or no greater than −10° C. when reacted to form a homopolymer. The Tg of these homopolymers is often greater than or equal to −80° C., greater than or equal to −70° C., greater than or equal to −60° C., or greater than or equal to −50° C. The Tg of these homopolymers can be, for example, in the range of −80° C. to 20° C., −70° C. to 10° C., −60° C. to 0° C., or −60° C. to −10° C.

The low Tg monomer may have the formula $$H_2C=CR^1C(O)OR^8$$

wherein $R^1$ is H or methyl and $R^8$ is an alkyl with 1 to 22 carbons or a heteroalkyl with 2 to 20 carbons and 1 to 6 heteroatoms selected from oxygen or nitrogen. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In some embodiments, the (meth)acryloyl polymer comprises low Tg monomer(s) having an alkyl group with 6 to 20 carbon atoms. In some embodiments, the low Tg monomer has an alkyl group with 6 to 12 carbon atoms. Exemplary monomers include, but are not limited to, 2-ethylhexyl methacrylate, isooctyl methacrylate, n-octyl methacrylate, 2-octyl methacrylate, isodecyl methacrylate, and lauryl methacrylate. Likewise, some heteroalkyl methacrylates such as 2-ethoxy ethyl methacrylate can also be used.

In some embodiments, the (meth)acryloyl polymer is a homopolymer. In other embodiments, the (meth) acryloyl polymer is a copolymer (derived from at least 2 different monomers).

In some embodiments, the (meth)acryloyl polymer comprises a high Tg monomer, having a Tg greater than 10° C. and typically of at least 15° C., 20° C., or 25° C., and preferably at least 50° C.

The high Tg monomer may have the formula $$H_2C=CR^1C(O)XR^8$$

wherein $R^1$ is H or methyl and $R^8$ is an alkyl with 1 to 22 carbons or a heteroalkyl with 2 to 20 carbons and 1 to 6 heteroatoms selected from oxygen or nitrogen, X is O or nitrogen. The alkyl or heteroalkyl group can be linear, branched, cyclic, or a combination thereof.

Suitable high Tg monomers include, for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, acrylamide, and propyl methacrylate or combinations.

When high Tg monomers are included in a pressure sensitive adhesive, the adhesive may include at least 1, 3, 5, 10, 15, 20, to 30 parts by weight of such high Tg monomer(s). However, in one embodiment, no high Tg monomer is included in the adhesive. This may be especially true in the present disclosure, wherein the substituted oligomeric quinoline can also act to reinforce the adhesive, diminishing the need for the high Tg monomer.

The alkyl (meth)acryl monomers are typically present in the (meth)acryloyl polymer in an amount of at least 85, 86, 87, 88, 89, or 90 up to 95, 96, 97, 98, or 99 parts by weight, based on 100 parts by weight of the total monomer or polymerized units.

The (meth)acryloyl polymer may optionally comprise an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

Due to their availability, acid functional monomers are generally selected from ethylenically unsaturated carboxylic acids, i.e., (meth)acrylic acids. When even stronger acids are desired, acidic monomers include the ethylenically unsaturated sulfonic acids and ethylenically unsaturated phosphonic acids. In some embodiments, the acid functional monomer is generally used in amounts of 0.5 to 15 parts by weight, preferably 0.5 to 10 parts by weight, based on 100 parts by weight total monomer or polymerized units.

The (meth)acryloyl copolymer may optionally comprise other monomers such as a non-acid-functional polar monomer. Representative examples of suitable polar monomers include but are not limited to 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth) acrylate, 2-methoxyethoxyethyl (meth)acrylate, 2-methoxyethyl methacrylate, polyethylene glycol mono (meth)acrylates; alkyl vinyl ethers, including vinyl methyl ether; and mixtures thereof. Preferred polar monomers include those selected from the group consisting of 2-hydroxyethyl (meth)acrylate and N-vinylpyrrolidinone.

When used, vinyl monomers useful in the (meth)acrylate polymer include vinyl esters (e.g., vinyl acetate and vinyl propionate), styrene, substituted styrene (e.g., a-methyl styrene), vinyl halide, and mixtures thereof. As used herein vinyl monomers are exclusive of acid functional monomers, acrylate ester monomers and polar monomers. Such vinyl monomers are generally used at 0 to 30 parts by weight, preferably 0 to 20 parts by weight, based on 100 parts by weight total monomer or polymerized units.

In one embodiment, a crosslinking monomer may be incorporated into the polymer for subsequent use in crosslinking. Such crosslinking monomer include, for example, trimethoxysilylpropyl 2-methylprop-2-enoate, acryloxy benzophenone (ABP), acryloxyethoxybenzophenone (AEBP), para-acryloxybenzophenone, para-acryloxy-ethoxybenzophenone, para-N-(methylacryloxyethyl)-carbamoylethoxybenzophenone, para-acryloxyacetophenone, ortho-acrylamidoacetophenone, acrylated anthraquinones, and the like.

The monomers described above can be polymerized using techniques known in the art. The polymerization may be a solution-based polymerization or may be solvent-free (less than 1 wt % of a liquid solvent is used). An initiator, such as a photoinitiator, can be used to initiate the polymerization. In one embodiment, a chain transfer agent, can be used during the polymerization of the (meth)acryloyl polymer to control the molecular weight and/or resultant properties of the adhesive. Chain transfer agents are materials that regulate free radical polymerization and are generally known in the art. Suitable chain transfer agents include halogenated hydrocarbons such as carbon tetrabromide; sulfur compounds such as lauryl mercaptan, butyl mercaptan, ethanethiol, isooctylthioglycolate (IOTG), 2-ethylhexyl thioglycolate, 2-ethylhexyl mercaptopropionate, 2-mercaptoimidazole, and 2-mercaptoethyl ether and mixtures thereof; or a cosolvent, such an alcohol, aromatic, or ketone.

Adhesive Compositions

The polymerized (meth)acryloyl polymer can be mixed with the dihydroquinoline to form the adhesive composition. In addition to the substituted oligomeric quinoline described above, a traditional glass transition temperature modifier such as one or more tackifiers, one or more plasticizers, or combinations thereof as is known in the art, may be added to the (meth)acryloyl polymer to enhance the adhesive properties of the composition. Plasticizers and tackifiers are used to adjust the glass transition temperature and/or to adjust the modulus of the composition of the composition to improve the adhesion of the composition to a substrate. Plasticizers and tackifiers known to those skilled in the art may be used.

Examples of suitable plasticizers include: hydrocarbon oils (e.g., those that are aromatic, paraffinic, or naphthnenic), hydrocarbon resins, polyterpenes, rosin esters, phthalates (e.g., terephthalate), phosphates esters, dibasic acid esters, fatty acid esters, polyethers (e.g., alkyl phenyl ether), epoxy resins, sebacate, adipate, citrate, trimellitate, dibenzoate, or combinations thereof. The plasticizers may be present in the composition in any suitable amount, such as for example, amounts up to about 50 parts by weight, 70 parts by weight, or even up to about 100 parts by weight, based on 100 parts by weight of the (meth)acryloyl polymer.

Examples of suitable tackifiers include rosins and their derivatives (e.g., rosin esters); polyterpenes and aromatic-modified polyterpene resins; coumarone-indene resins; hydrocarbon resins, for example, alpha pinene-based resins, beta pinene-based resins, limonene-based resins, aliphatic hydrocarbon-based resins, aromatic-modified hydrocarbon-based resins; or combinations thereof. Non-hydrogenated tackifiers resins are typically more colorful and less durable (i.e., weatherable). Hydrogenated (either partially or completely) tackifiers may also be used. Examples of hydrogenated tackifiers include, for example: hydrogenated rosin esters, hydrogenated acids, hydrogenated aromatic hydrocarbon resins, hydrogenated aromatic-modified hydrocarbon-based resins, hydrogenated aliphatic hydrocarbon-based resins, or combinations thereof. Examples of synthetic tackifiers include: phenolic resins, terpene phenolic resins, poly-t-butyl styrene, acrylic resins, or combinations thereof.

Any suitable amount of the second tackifier may be used. In some embodiments, the second tackifier may be present in the composition in an amount of greater than about 40 parts by weight based on 100 parts by weight of the adhesive copolymer. Optionally, the second tackifier may be present in an amount of about 5 parts by weight to about 400 parts by weight, 5 parts by weight to about 200 parts by weight, 5 parts by weight to about 140 parts by weight, or even 5 parts by weight to about 40 parts by weight, based on the weight of the (meth)acryloyl polymer.

In some embodiments, the second tackifiers may be selectively combined with the substituted oligomeric quinoline to improve the performance of the composition.

In one embodiment a crosslinking agent may be added to crosslink the (meth)acryloyl polymer. The crosslinking agents include both physical and chemical crosslinking agents. Exemplary crosslinking agents include: benzophenone, peroxides, or compounds having at least two aziridine, or initiators such as a photoinitiator. The crosslinking may be initiated thermally or by exposure to radiation (e.g. gamma, e-beam, or UV). The crosslinking agent may be present in the compositions of the present disclosure in any suitable amount, such as, for example, amounts up to about 5 parts by weight based on 100 parts by weight of the total composition.

Other optional additives include, for example, stabilizers (e.g., anti-oxidants or UV-stabilizers), corrosion inhibitors, pigments, dyes, medicaments, thickeners (e.g., polyamides), or combinations thereof. Use of such additives is well known to those of ordinary skill in the art. The additives may be present in an amount from 0.5% by weight to 5% by weight based upon the weight of the total aerosol mixture. Certain additives may be of lower weight percent, e.g., a pigment may be added at less than 0.05% or even less than 0.005% by weight.

Preferred anti-oxidants include phenols, phosphites, thioesters, amines, polymeric hindered phenols, copolymers of 4-ethyl phenols, reaction product of dicyclopentadiene and butylene, or combinations thereof. Additional examples include phenyl-alpha-naphthylamine, phenyl-beta-naphthylamine, phenyl-beta-naphthylene, 2,2'-methylene bis (4-methyl-6-tertiary butyl phenol), phenolic-based anti-oxidants sold under the trade designation "CIBA IRGANOX 1010" by from Ciba Specialty Chemicals Corp., Tarrytown, N.Y., or combinations thereof.

UV-stabilizers such as UV-absorbers are chemical compounds that can intervene in the physical and chemical processes of photoinduced degradation. Exemplary UV-absorbers include: benzotriazole compound, 5-trifluoromethyl-2-(2-hydroxy-3-alpha-cumyl-5-tert-octylphenyl)-2H-benzotriazole, or combinations thereof. Other exemplary benzotriazoles include: 2-(2-hydroxy-3,5-di-alpha-cumylphehyl)-2H-benzotriazole, 5-chloro-2-(2-hydroxy-3-tert-butyl-5-methylphenyl)-2H-benzotiazole, 5-chloro-2-(2-hydroxy-3,5-di-tert-butylphenyl)-2H-benzotriazole, 2-(2-hydroxy-3,5-di-tert-amylphenyl)-2H-benzotriazole, 2-(2-hydroxy-3-alpha-cumyl-5-tert-octylphenyl)-2H-benzotriazole, 2-(3-tert-butyl-2-hydroxy-5-methylphenyl)-5-chloro-2H-benzotriazole, or combinations thereof. Additional exemplary UV-absorbers include 2(-4,6-diphenyl-1-3,5-triazin-2-yl)-5-hexcyloxy-phenol, and those available from Ciba Specialty Chemicals Corp. sold under the trade designations "CIBA TINUVIN 1577" and "CIBA TINUVIN 900". In addition, UV-absorber(s) can be used in combination with hindered amine light stabilizer(s) (HALS) and/or anti-oxidants. Exemplary HALSs include those available from Ciba Specialty Chemicals Corp. sold under the trade designations "CIBA CHIMASSORB 944" and "CIBA TINUVIN 123".

Corrosion inhibitors are chemical compounds that can intervene in the chemical reactions of the composition with its metal surroundings, e.g., a storage drum or a containment vessel. Exemplary corrosion inhibitors include: sulphonates, morpholine, benzotriazole, various amines, sodium benzoate, sodium nitrite, quaternary ammonium nitrites, sodium silicate, sodium tetraborate, ammonium nitrite, acetylenic derivatives, sodium molybdate, formamide, or combinations thereof, and others well known to those of ordinary skill in the art such as those disclosed in "Corrosion Inhibitors, An Industrial Guide", by Ernest W. Flick, $2^{nd}$ ed., Noyes Publications, Park Ridge, N.J., 1993.

In one embodiment, the adhesive composition includes a solvent. The solvent is used to solublize or disperse the composition comprising the (meth)acryloyl polymer. The (meth)acryloyl polymer may be soluble in the solvent or insoluble in the solvent. The glass transition temperature modifiers may be soluble in the solvent or insoluble in the solvent. The additives may be soluble in the solvent or insoluble in the solvent. As used herein, "soluble" means that when visually observed, a solution is a substantially uniform, clear or opalescent solution with no apparent particulates or gel formation. Soluble can be observed, for example, by centrifugation which results in no phase separation or change in the composition throughout the centrifugation tube, or does not phase separate upon aging.

In one embodiment, the weight of the solvent comprises less than 90%, less than 85%, less than 75%, less than 65%, or even less than 55% of the combined weight of the composition and the solvent.

Exemplary solvents include: acetates, halogenated solvents, aliphatics, cycloaliphatics, aromatics, alcohols, esters, water, ketones, or combinations thereof. Examples include: methyl acetate, acetone, ethanol, diacetone alcohol, toluene, cyclohexane, hexane, pentane, or combinations thereof.

The composition can typically be prepared by mixing the (meth) acryloyl polymer, the crosslinking agent (if needed), the substituted oligomeric quinoline, and any adjuvants (if desired) in conventional processing equipment. This may be done in a solvent or in a solvent-less environment. The desired amounts of compounding ingredients and other conventional adjuvants or ingredients can be added to the composition and intimately admixed or compounded therewith by employing any of the conventional mixing devices such as extruders, static mixers, internal mixers, (e.g., Banbury mixers), two roll mills, or any other convenient mixing devices. The temperature of the mixture during the mixing process typically is kept safely below the cross-linking temperature of the composition. During mixing, it generally is desirable to distribute the components and adjuvants uniformly.

In one embodiment of this disclosure, the adhesive composition may be processed (such as by coating or molding) in a solvent or a solvent-less environment. For example, the composition may be coated without the presence of a solvent, or may be coated in the presence of a solvent. The solvent may be removed, for example, by thermal evaporation. Additionally, the amount of solvent in the composition may be adjusted, depending on the application so as to obtain a desired viscosity of the composition. For example, the viscosity may be adjusted to obtain a desired flow rate.

The compositions prepared in accordance with the present disclosure are easily coated upon suitable flexible or inflexible backing materials by conventional coating techniques to produce adhesive coated sheet materials in accord with the present disclosure. The flexible backing material may be any material conventionally utilized as a tape backing or any other flexible material. Typical examples of flexible backing materials employed as conventional tape backings, which may be useful for the adhesive compositions of the present disclosure include those made of paper, plastic films such as polypropylene, polyurethane, polyethylene, polyvinyl chloride, polyester (e.g., polyethylene terephthalate), cellulose acetate, and ethyl cellulose.

Backings may also be prepared of fabric such as woven fabric formed of threads of synthetic or natural materials such as cotton, nylon, rayon, glass, ceramic material, and the like or nonwoven fabric such as air laid webs of natural or synthetic fibers or blends of these. The backing may also be formed of metal, metalized polymeric films, or ceramic sheet materials. The coated sheet materials may take the form of any article conventionally known to be utilized with PSA compositions such as labels, tapes, signs, covers, marking indicia, and the like.

These coated papers or thermoplastic films are often siliconized or otherwise treated to impart improved release characteristics. One or both sides of the backings or liners could have such release characteristics. Generally the backing or substrate material is about 50 μm (micrometer) to about 155 μm in thickness, although thicker and thinner backing or substrate materials are not precluded.

The adhesive compositions of the present invention may be coated by any of a variety of conventional coating techniques known in the art, such as roll coating, spray coating, knife coating, extrusion, die-coating, and the like. In particular, the adhesive composition can be solvent coated, or hot-melt coated to avoid the evolution of volatiles in the coating operation.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

These abbreviations are used in the following examples: g=gram, ipm=inches per minute, hr=hour, kg=kilograms, min=minutes, mol=mole; cm=centimeter, mm =millimeter, ml=milliliter, L=liter, psi=pressure per square inch, MPa=megaPascals, oz=ounce(s) and wt=weight.

| | Materials Table |
|---|---|
| Name | Source |
| A1 | Sterically hindered oligomeric amine, available under the trade designation "UVINUL 5050" from BASF corp., Florham Park, NJ. Melting point 104-112° C., molecular weight 3000-4000 g/mol |
| A2 | 1,6-Hexanediamine, N,N'-bis(2,2,6,6-tetramethyl-4-piperidinyl)-, Polymers with morpholine-2,4,6-trichloro-1,3,5-triazine, available under the trade designation "CYASORB UV 3529" from Cytec Industries Inc., West Paterson, NJ. Tg 88° C., average molecular weight 1700 g/mol ±10% |
| A3 | Poly [(6-morpholino-s-triazine-2,4-diyl)[2,2,6,6-tetramethyl-4-piperidyl) imino]-hexamethylene [(2,2,6,6-tetramethyl-4-piperidyl) imino]], available under the trade designation "CYASORB UV 3346" from Cytec Industries Inc., West Paterson, NJ. Melting point 90-100° C., average molecular weight 1600 g/mol ±10% |
| A4 | Bis(2,2,6,6-tetramethyl-4-piperidinyl) sebacate available under the trade designation "LOWILITE 77" from Addivant, Danbury, CT. Melting point 80-85° C., molecular weight 481 g/mol |
| TACK 1 | Substituted oligomeric quinoline, sold under the trade designation "AGERITE D", softening point of 82-102° C. using ATSM D-3461, T-5A |
| TACK 2 | Substituted oligomeric quinoline, sold under the trade designation "AGERITE MA", softening point of 115-135° C. using ATSM D-3461, T-5A |
| C-TACK 1 | A rosin ester available under the trade designation "FORAL 85" from Pinova Inc., Brunswick, GA; softening point 80-88° C. (as stated on technical data sheet) |
| C-TACK 2 | A terpene phenolic available under the trade designation "SYLVARES TP96" from Arizona Chemical, Jacksonville, FL; softening point 92-98° C. |
| C-TACK 3 | aromatically modified C5 hydrocarbon resin available under the trade designation "WINGTAK 86: from Cray Valley; softening point 87° C. |
| Initiator 1 | 2,2' azobis(2-methylpropionitrile) available under the trade designation "VAZO 64" from E.I du Pont de Nemours and Co., Wilmington, DE |
| Initiator 2 | 75% benzoyl peroxide in water available under the trade designation "LUPEROX A75" |
| Initiator 3 | 2,2' azobis(2-methylbutyronitrile) available under the trade designation "VAZO 67" from E.I du Pont de Nemours and Co., Wilmington, DE |
| Antioxidant | Hindered thiophenol antioxidant available under the trade designation "LOWINOX TBM6" from Addivant USA, Middlebury, CT |

PSA A

PSA A can be prepared as follows: 203.5 g of 2-Ethylhexyl acrylate monomer, 8.5 g acrylic acid monomer, and 188.0 g ethyl acetate were placed into a glass bottle. Initiator, 0.424 g Initiator 1 was added to the glass bottle and dissolved. Nitrogen was bubbled through the solution at a rate of about 1 liter/min for 2 min. The bottle was then sealed and placed in a rotating water bath at 55° C. for 48 hr. The bottle was removed from the water bath and allowed to cool. Then, 89 g of ethyl acetate and 475 g of heptanes was added to dilute the mixture. Antioxidant at 1.06 g was added and the solution was mixed until the powder was dissolved and the solution was uniform in viscosity.

PSA B

PSA B can be prepared as follows: 6.0 g acrylamide, and 249.5 g ethyl acetate were placed into a glass bottle and mixed to dissolve the acrylamide before 144.4 isooctyl acrylate was added. Initiator 2 (0.260 g) was added to the glass bottle and dissolved. Nitrogen was bubbled through the solution at a rate of about 1 liter/min for 2 min. The bottle was then sealed and placed in a rotating water bath at 60° C. for 24 hr. The bottle was removed from the water bath and allowed to cool. Then, 250.0 g of heptane was added to dilute the mixture. Antioxidant at 0.79 g was added and the solution was mixed until the powder was dissolved and the solution was uniform in viscosity.

PSA C

PSA C can be prepared as follows 77.1 g 2-ethylhexyl acrylate, 7.2 g acrylic acid, 76.3 g butyl acrylate, 197.0 g ethyl acetate, and 36.1 g toluene were placed into a glass bottle. Initiator, 0.128 g Initiator 3 was added to the glass bottle and dissolved. Nitrogen was bubbled through the solution at a rate of about 1 liter/min for 2 min. The bottle was then sealed and placed in a rotating water bath at 60° C. for 24 hr. The bottle was removed from the water bath and allowed to cool. Then, 135 g ethyl acetate was added to dilute the mixture and the solution was mixed until uniform in viscosity.

Substrates

Substrate 1: glass plate available from ChemInstruments, Inc., Fairfield, Ohio.

Substrate 2: 304 Stainless Steel with a bright annealed finish available from ChemInstruments Substrate 3: low density polyethylene (LDPE) available from Plastics International Substrate 4: polyolefin Substrate 5: polyethylene terephthalate (PET) available from Mitsubishi Polyester Film, Inc., Greer, S.C.

Prior to applying the adhesive, substrates 1 and 2 were cleaned one time with diacetone alcohol and 3 times with heptane. The substrates 3 and 4 were not cleaned prior to use, and were discarded after the surface was used.

Preparation of Pressure Sensitive Adhesive Tapes

Various types and amounts of tackifier as indicated in the respective examples were added to the PSA solutions as described above. The samples were prepared in glass jars, which were then placed on a roller until the additives dissolved and the samples appeared homogeneous.

The resulting solutions were then coated on a 2 mil (about 50 micrometer) polyethylene terephthalate (PET) film from Mitsubishi Polyester Film, Inc., Greer, S.C. to a target dry thickness of 1.0 (+/−0.2) mil. The coatings were dried in a Despatch oven at 65° C. for 10 min. The samples were then conditioned for at least 4 hours at 72° F. (22° C)/50% relative humidity before Shear and Peel Strength testing.

Test Methods:

Peel Force: The peel force strength was conducted at 72° F. (22° C)/50% relative humidity. Sample strips were cut down to the specified width (either 0.5 inches (12.7 mm) or 1.0 inch (25 mm) in width by approximately 6 inches (152 mm) length. The test panels were placed directly into an IMASS slip/peel tester, IMASS Inc., Accord, Mass. The sample strip was attached to the edge of the specified substrate with the adhesive side contacting the substrate and the sample was rolled down once with a 4.5 lb roller. The peel force was measured (with no dwell time) at 180 degrees at the specified rates of peel (either 12 or 90 inches per minute). The numbers reported at peel rates of 12 ipm are the average of 5-6 measurements taken from two separate test strips. Those reported at peel rates of 90 ipm are the average of 3 measurements, each taken from a different test strip.

Shear: The static shear was conducted at 72° F. (22° C)/50% relative humidity. The samples were cut into strips 0.5 in (12.7 mm) width by approximately 6 in (152 mm) length. A loop was prepared at one end of the strip in order to hold the specified weight. The strip was attached to the edge of the specified substrate using the opposite end to the loop with the adhesive side contacting the substrate. The strip was attached precisely and bubble free so, as to obtain a bonded area of 0.5 in$^2$ (323 mm$^2$). A 4.5 pound (2 kilogram) roller was passed over the sample four times (2 passes in each direction) with a rolling stroke of ~3 inches (76.2 mm) and all four passes being completed over 6-8 seconds to obtain intimate contact between the adhesive and the substrate surface. The test panels were placed directly (with no dwell) in the shear stand of the testing equipment (test plate held at)2° and the specified load of 1 kg was placed in the loop of the sample. The timer was started. The test was stopped at failure and the test results were expressed in minutes. The quoted static shear values are the average of two shear measurements.

Experiment 1

Various types and amounts of tackifier were added to PSA A and PSA B as shown in Table 1 below. The peel force on stainless steel, glass and LDPE was measured along with the shear on stainless steel. The results are shown in Table 1.

TABLE 1

| Trial | PSA | Tackifier | Parts Tackifier | Peel Force (Oz/0.5 in) | | | Shear Stainless Steel (min) |
|---|---|---|---|---|---|---|---|
| | | | | Stainless Steel | Glass | LDPE | |
| C1 | A | None | 0 | 21.2 | 38.8 | 17.7 | 4.0 |
| 2 | A | TACK 1 | 10 | 29.8 | 44.3 | 20.9 | 7.0 |
| 3 | A | TACK 1 | 30 | 47.1 | 48.0 | 1.6(s) | 21.0 |
| C4 | A | C-TACK 1 | 10 | 23.8 | 42.3 | 21.4 | 3.5 |
| C5 | A | C-TACK 1 | 30 | 32.9 | 52.2 | 31.3 | 5.0 |
| C6 | A | C-TACK 2 | 10 | 27.3 | 44.1 | 22.8 | 6.5 |
| C7 | A | C-TACK 2 | 30 | 41.9 | 49.9 | 5.0(s) | 14.5 |
| C8 | A | C-TACK 3 | 10 | 25.6 | 41.3 | 28.3 | 4.5 |
| C9 | A | C-TACK 3 | 30 | 27.8 | 43.9 | 30.8 | 7.5 |
| C10 | B | None | 0 | 22.8 | 34.3 | 14.1 | 70 |
| 11 | B | TACK 1 | 10 | 33.8 | 41.4 | 10.9(s) | 87.0 |
| 12 | B | TACK 1 | 30 | 50.2 | 32.1(s) | 0.7(s) | 197.5 |
| C13 | B | C-TACK 1 | 10 | 25.2 | 37.8 | 19.7 | 56.5 |
| C14 | B | C-TACK 1 | 30 | 36.1 | 51.1 | 27.0 | 48.5 |

TABLE 1-continued

| Trial | PSA | Tackifier | Parts Tackifier | Peel Force (Oz/0.5 in) Stainless Steel | Glass | LDPE | Shear Stainless Steel (min) |
|---|---|---|---|---|---|---|---|
| C15 | B | C-TACK 2 | 10 | 27.7 | 39.2 | 19.8 | 98.5 |
| C16 | B | C-TACK 2 | 30 | 43.6 | 28.2(s) | 3.1(s) | 202.5 |
| C17 | B | C-TACK 3 | 10 | 26.4 | 38.2 | 24.6 | 78.0 |
| C18 | B | C-TACK 3 | 30 | 40.5 | 50.6 | 38.4 | 114.0 |

(s)shocky peel

Example 2

To PSA A, various amounts of TACK 1 shown as parts per 100 parts of PSA A solids were added. Samples were mixed overnight on a roller to yield a solution of uniform appearance which was then coated and dried. Pressure sensitive adhesive tapes as described above were prepared and tested for peel force on stainless steel and the shear on PET and stainless steel was measured. The results are shown in Table 2.

TABLE 2

| Trial | Parts TACK 1 used | Peel Force (Oz/0.5 in) 12 ipm | Shear to PET (min) | Shear to SS (min) |
|---|---|---|---|---|
| 1 | 0.0 | 40.6 | 4 | 4 |
| 2 | 0.5 | 36.6 | NT | 5 |
| 3 | 1.0 | 45.6 | NT | 4.5 |
| 4 | 2.0 | 50.0 | NT | 5.5 |
| 5 | 10 | 60.6 | 8 | 7 |
| 6 | 25 | 84.5 | 16 | 23.5 |
| 7 | 50 | 94.0 | 91.5 | NT |
| 8 | 75 | <1 | 376.5 | 380.5 |
| 9 | 100 | 0 | 1608.5 | 1609.5 |

NT—not tested

Example 3

To PSA C, various amounts of TACK 1 shown as parts per 100 parts PSA C solids were added. Pressure sensitive adhesive tapes as described above were prepared and tested for peel force on stainless steel, glass, and LDPE along with the shear on stainless steel. The results are shown in Table 3.

TABLE 3

| Trial | Parts TACK 1 used | Peel Force Glass 90 ipm Oz/0.5 in | Stainless Steel 12 ipm oz/0.5 in | LDPE 12 ipm Oz/in | Shear on Stainless Steel (min) |
|---|---|---|---|---|---|
| 1 | 0 | 23.5 | 21.3 | 5.1 | 1.0 |
| 2 | 5 | 28.4 | 26.0 | 7.7 | 2.0 |
| 3 | 10 | 32.2 | 31.0 | 8.5 | 3.0 |
| 4 | 15 | 35.7 | 32.7 | 12.2 | 4.0 |
| 5 | 20 | 39.2 | 34.6 | 15.3 | 6.5 |
| 6 | 25 | 41.7 | 37.8 | 14.3 | 10.0 |
| 7 | 30 | 44.5 | 41.8 | 9.8 | 14.0 |
| 8 | 35 | 44.8 | 42.3 | 3.4 | 23.0 |
| 9 | 40 | 46.0 | 43.5 | 1.9 | 37.0 |
| 10 | 45 | 49.1 | 49.2 | 1.6 | 53.5 |
| 11 | 50 | 55.1 | 43.2 | 1.3 | 84.0 |

Example 4

To 100 parts solids of a PSA, various amounts of TACK 1 or TACK 2 or no tackifier were added. Pressure sensitive adhesive tapes as described above were prepared and tested for peel force on stainless steel and glass was measured along with the shear on stainless steel. The results are shown in Table 4.

TABLE 4

| Trial | PSA | TACK used | Parts TACK used | Peel Force Glass 12 ipm (Oz/0.5 in) | Glass 90 ipm (Oz/0.5 in) | Stainless Steel 12 ipm (Oz/in) | Shear on Stainless Steel (min) |
|---|---|---|---|---|---|---|---|
| 1 | A | 0 | None | 22.7 | 33.7 | 44.5 | 5.0 |
| 2 | A | TACK 1 | 20 | 38.0 | 43.4 | 79.6 | 14.5 |
| 3 | A | TACK 2 | 20 | 40.8 | 39.1 | 82.8 | 33.5 |
| 4 | A | TACK 1 | 40 | 48.7 | 50.0* | 114.1 | 51.5 |
| 5 | A | TACK 2 | 40 | 50.0* | 50.0* | 115.0* | 264.5 |
| 6 | B | 0 | None | 26.3 | 34.4 | 49.1 | 79.0 |
| 7 | B | TACK 1 | 20 | 38.3 | 44.8 | 85.9 | 141.5 |
| 8 | B | TACK 2 | 20 | 42.3 | 42.8 | 89.7 | 215.0 |
| 9 | B | TACK 1 | 40 | 50.0 | 50.0* | 110.1 | 1038.5 |
| 10 | B | TACK 2 | 40 | 50.0* | 50.0* | 115.0* | 361.5 |

*indicates that the adhesive came off the PET backing and remained on the stainless steel or glass Example 5

The substituted oligomeric quinoline can hydrogen bond, and hydrogen bonding is known to improve shear performance on acryloyl-containing adhesives. Therefore, other additives with the ability to hydrogen bond were examined. Shown in Table 5 below are the compositions of the various samples. For the samples comprising PSA A, 70g of PSA A comprising 23.4% solids were mixed with the additive shown in Table 5 and the appearance after mixing was noted. For the samples comprising PSA B, 70 g of PSA B comprising 22.0% solids were mixed with the additive shown in Table 5. Also shown in Table 5 is whether or not the resulting solution was coatable, meaning the solution was free of chucks and was of a sufficient viscosity to enable spreading. Methanol (MeOH) and/or toluene was added in the amounts specified to adjust the viscosity and/or disperse the additive in the PSA.

TABLE 5

| Sample | PSA used | Additive Used | Amount Additive (g) | MeOH added (g) | Toluene added (g) | Coatable |
|---|---|---|---|---|---|---|
| 1 | A | None | 0 | 0 | 0 | yes |
| 2 | A | A1 | 1.54 (10%) | 20 | 10 | yes |
| 3 | A | A1 | 3.08 (20%) | 20 | 10 | yes |
| 4 | A | A2 | 1.54 (10%) | 10 | 10 | yes |
| 5 | A | A2 | 3.08 (20%) | 10 | 10 | yes |
| 6 | A | A3 | 1.54 (10%) | 10 | 10 | yes |
| 7 | A | A3 | 3.08 (20%) | 20 | 10 | yes |
| 8 | A | A4 | 1.54 (10%) | 10 | 0 | yes |
| 9 | A | A4 | 4.62 (30%) | 10 | 0 | yes |
| 10 | A | TACK1 | 1.54 (10%) | 0 | 0 | yes |
| 11 | A | TACK 1 | 4.62 (30%) | 0 | 0 | yes |
| 12 | B | None | 0 | 0 | 0 | yes |
| 13 | B | A1 | 1.64 (10%) | 0 | 0 | yes |
| 14 | B | A1 | 4.91 (30%) | 0 | 0 | yes |
| 15 | B | A2 | 1.64 (10%) | 0 | 0 | yes |
| 16 | B | A2 | 4.91 (30%) | 0 | 0 | no |
| 17 | B | A3 | 1.64 (10%) | 0 | 0 | yes |
| 18 | B | A3 | 4.91 (30%) | 0 | 0 | no |
| 19 | B | A4 | 1.64 (10%) | 0 | 0 | yes |
| 20 | B | A4 | 4.91 (30%) | 0 | 0 | yes |
| 21 | B | TACK1 | 1.64 (10%) | 0 | 0 | yes |
| 22 | B | TACK 1 | 4.91 (30%) | 0 | 0 | yes |

The samples from Table 5 were coated onto PET as described in the preparation of pressure sensitive adhesive tapes above and they were tested for peel force on stainless steel, polyolefin, and glass along with the shear on stainless steel. The results are shown in Table 6.

TABLE 6

| | Peel Force | | | |
|---|---|---|---|---|
| Sample | Stainless Steel 12 ipm (oz/0.5 in) | Glass 90 ipm (oz/0.5 in) | Polyolefin 12 ipm (oz/in) | Shear on Stainless Steel (min) |
| 1 | 20.0 | 36.6 | 8.5 | 3.5 |
| 2 | 25.3 | 19.4(s) | 0.3 | 20942(d) |
| 3 | 13.8 | 1.3(s) | 0.0 | 20938(d) |
| 4 | 35.9 | 33.6 | 2.2 | 1810 |
| 5 | 42.3 | 16.8(s) | 0.6 | 2468 |
| 6 | 3.8(s) | 0.0 | 0.0 | 20932(d) |
| 7 | 0.0 | 0.0 | 0.0 | 20929(d) |
| 8 | 10.9 | 7.2(s) | 0.2 | 2484.0 |
| 9 | 4.7 | 7.9(s) | 0.2 | 1279.0 |
| 10 | 28.8 | 43.0 | 2.4 | 7.0 |
| 11 | 42.3 | 44.5(s) | 18.8 | 23.5 |
| 12 | 22.6 | 35.2 | 3.9 | 49.5 |

TABLE 6-continued

| | Peel Force | | | |
|---|---|---|---|---|
| Sample | Stainless Steel 12 ipm (oz/0.5 in) | Glass 90 ipm (oz/0.5 in) | Polyolefin 12 ipm (oz/in) | Shear on Stainless Steel (min) |
| 13 | 8.9 | 21.3 | 4.8 | 63.5 |
| 14 | 5.9 | 19.8 | 4.9 | 82.0 |
| 15 | 31.6 | 41.7 | 10.2 | 79.5 |
| 16 | nt | nt | nt | nt |
| 17 | 34.2 | 45.2 | 9.5 | 73.5 |
| 18 | nt | nt | nt | nt |
| 19 | 13.7 | 29.8 | 4.8 | 16.5 |
| 20 | 6.0 | 8.6 | 2.0 | 62.5 |
| 21 | 34.7 | 47.3 | 10.2 | 65.5 |
| 22 | 49.2 | 47.8(s) | 15.5 | 157.0 | nt—not tested,
(s)shocky peel,
(d)discontinued study due to high shear

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. An adhesive composition comprising:
   (a) a (meth)acryloyl polymer; and
   (b) greater than 1 parts of a tackifier per 100 parts of the (meth)acryloyl polymer,
   wherein the tackifier comprises a substituted oligomeric quinoline.

2. The adhesive composition of claim 1, wherein the substituted oligomeric quinoline has a softening point of at least 70° C.

3. The adhesive composition of claim 1, comprising greater than 10 parts and less than 30 parts of the tackifier per 100 parts of the (meth)acryloyl polymer.

4. The adhesive composition of claim 1, wherein the (meth)acryloyl polymer is derived from a polar momoner selected from at least one of acrylic acid, acrylamide, or combinations thereof.

5. The adhesive composition of claim 1, wherein the (meth)acryloyl polymer is derived from a crosslinking monomer.

6. The adhesive composition of claim 1, wherein the composition comprises a second tackifier.

7. The adhesive composition of claim 1, wherein the composition is substantially free of a second tackifier.

8. An article comprising the adhesive composition of claim 1.

9. A method of making an adhesive article comprising:
   (i) providing an adhesive composition according to claim 1; and
   (ii) applying the adhesive composition onto a substrate.

10. The method of claim 9, wherein the adhesive composition is solution coated onto the substrate.

11. The method of claim 9, wherein the adhesive composition is hot melt coated onto the substrate.

* * * * *

UNITED STATES PATENT AND TRADEMARK OFFICE
CERTIFICATE OF CORRECTION

PATENT NO. : 9,926,469 B2
APPLICATION NO. : 15/514141
DATED : March 27, 2018
INVENTOR(S) : Kimberly Schultz It is certified that error appears in the above-identified patent and that said Letters Patent is hereby corrected as shown below:

In the Specification

Column 3,
Line 32, delete "quinolineis" and insert -- quinoline is --, therefor.
Line 36, delete "quinolineper" and insert -- quinoline per --, therefor.
Line 49, delete "Elseveir," and insert -- Elsevier, --, therefor.

Column 4,
Line 54, delete "R¹'" and insert -- $R^1$ --, therefor.

Column 5,
Line 55, delete "a-methyl" and insert -- α-methyl --, therefor.

Column 6,
Line 8, delete "wt %" and insert -- wt. % --, therefor.
Line 38, delete "naphthnenic)," and insert -- naphthenic), --, therefor.

Column 7,
Line 59, delete "-hexcyloxy-" and insert -- -hexyloxy- --, therefor.

Column 8,
Line 14, delete "solublize" and insert -- solubilize --, therefor.

Column 12,
Line 36, delete "at)2°" and insert -- at 2° C.) --, therefor.

In the Claims

Column 16,
Line 39, Claim 4, delete "momoner" and insert -- monomer --, therefor.

Signed and Sealed this
Fifteenth Day of May, 2018

Andrei Iancu
*Director of the United States Patent and Trademark Office*